United States Patent [19]
Graf

[11] Patent Number: 6,006,151
[45] Date of Patent: Dec. 21, 1999

[54] CONTROLLER FOR AN AUTOMATIC TRANSMISSION IN A MOTOR VEHICLE

[75] Inventor: Friedrich Graf, Regensburg, Germany

[73] Assignee: Siemens Aktiengesellschaft, Munich, Germany

[21] Appl. No.: 09/114,735

[22] Filed: Jul. 13, 1998

Related U.S. Application Data

[63] Continuation of application No. PCT/DE96/02437, Dec. 17, 1996.

[30] Foreign Application Priority Data

Jan. 11, 1996 [DE] Germany .......................... 196 00 820

[51] Int. Cl.$^6$ .................................................. F16H 61/02
[52] U.S. Cl. .............................................. 701/57; 701/58
[58] Field of Search ................................. 701/51, 52, 55, 701/56, 57, 58, 59, 61; 477/143, 155

[56] References Cited

U.S. PATENT DOCUMENTS

| | | | |
|---|---|---|---|
| 5,019,979 | 5/1991 | Tahahashi | 701/57 |
| 5,031,100 | 7/1991 | Takahashi | 701/55 |
| 5,099,428 | 3/1992 | Tahahashi | 701/59 |
| 5,323,318 | 6/1994 | Hasegawa et al. | 701/57 |
| 5,389,050 | 2/1995 | Sakai et al. | 701/57 |
| 5,390,117 | 2/1995 | Graf et al. | 701/57 |
| 5,519,610 | 5/1996 | Tsutsui et al. | 701/51 |
| 5,618,243 | 4/1997 | Kondo et al. | 477/118 |

FOREIGN PATENT DOCUMENTS

| | | |
|---|---|---|
| 0 638 742 A1 | 2/1995 | European Pat. Off. . |
| 0 645 559 A1 | 3/1995 | European Pat. Off. . |
| 33 41 652 C2 | 12/1987 | Germany . |
| 41 01 902 A1 | 8/1991 | Germany . |
| 43 37 164 A1 | 5/1994 | Germany . |
| WO 97/25555 | 7/1997 | WIPO . |

*Primary Examiner*—William A. Cuchlinski, Jr.
*Assistant Examiner*—Edward J. Pipala
*Attorney, Agent, or Firm*—Herbert L. Lerner; Laurence A. Greenberg

[57] ABSTRACT

The controller is used, in particular, for controlling an automatic transmission in a motor vehicle. An actuation signal is defined and used to determine the gear speed which is to be selected or the transmission ratio which is to be set. The actuation signal is a function of the position of the accelerator pedal, of the vehicle speed or, possibly, of further measured of variables. The controller includes a classification system which receives the measured variables and parameters derived therefrom as input variables and which generates output variables with reference to an evaluation of the measured variables and parameters. The output variables take into account certain assignments of the driving behavior of the driver, the respective driving state or the respective load state of the motor vehicle. The controller contains an evaluation circuit in which an intervention signal, which is generated by manual intervention by the driver, is evaluated and, subsequent thereto, one of the prescribed assignments is modified by emitting an evaluation signal. In this context, subfunctions of the controller can be switched off or important stored parameters of subfunctions can be modified without entirely deactivating them.

10 Claims, 5 Drawing Sheets

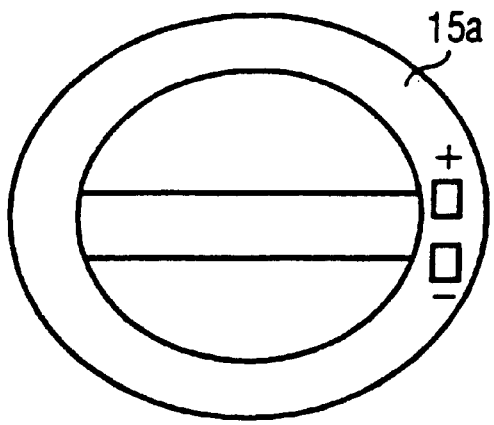
Buttons on Steering Wheel
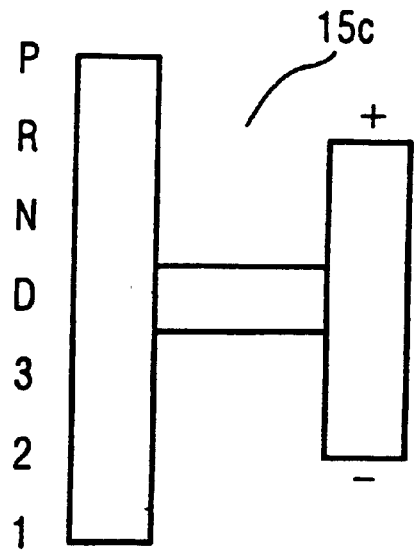
Manual slot
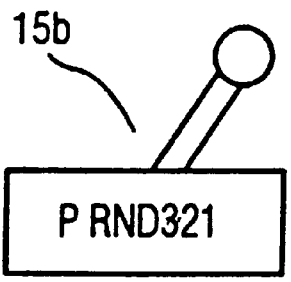
Conventional selector lever
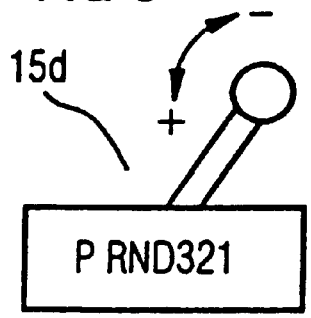
Operating rocker on selector lever

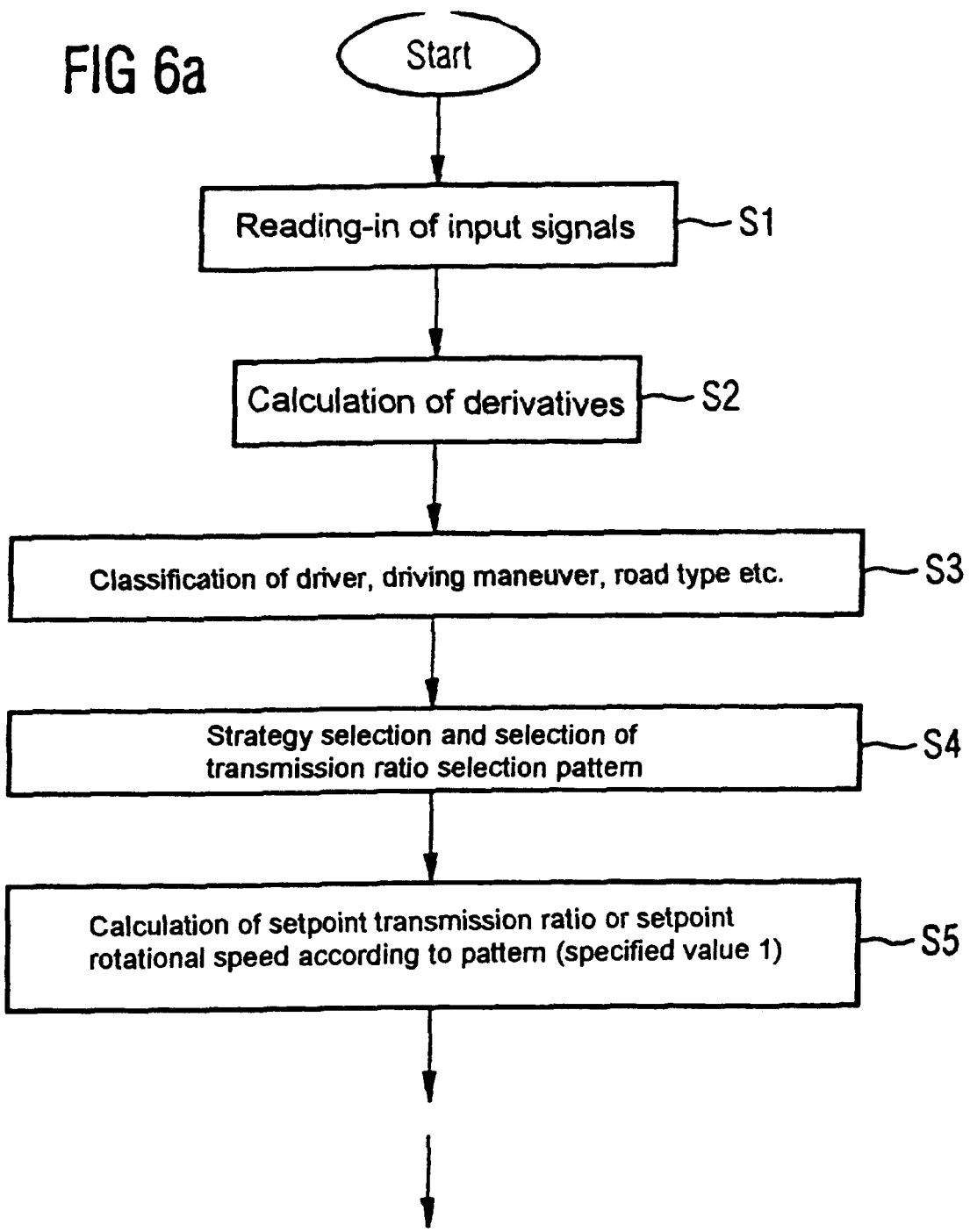

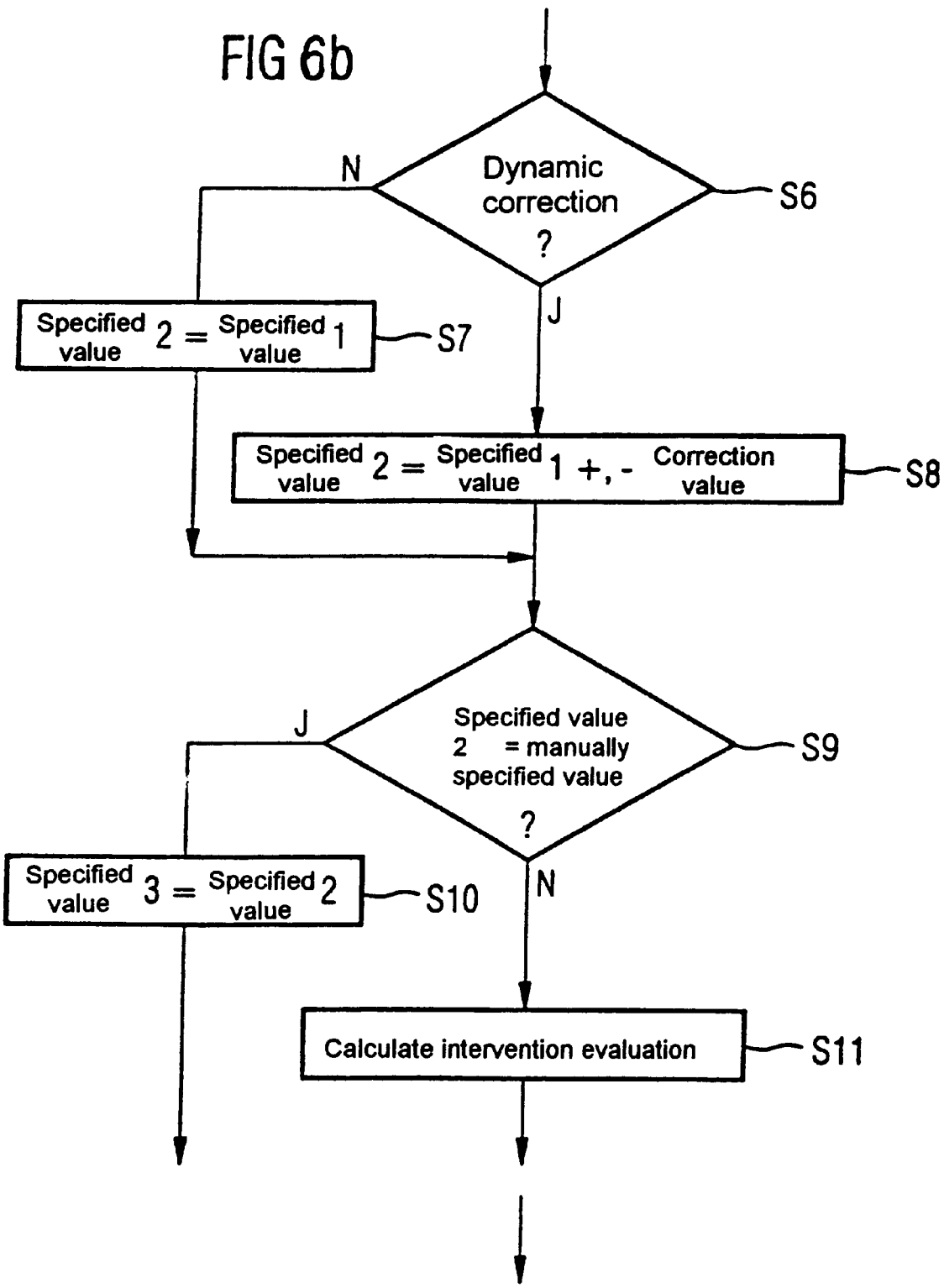

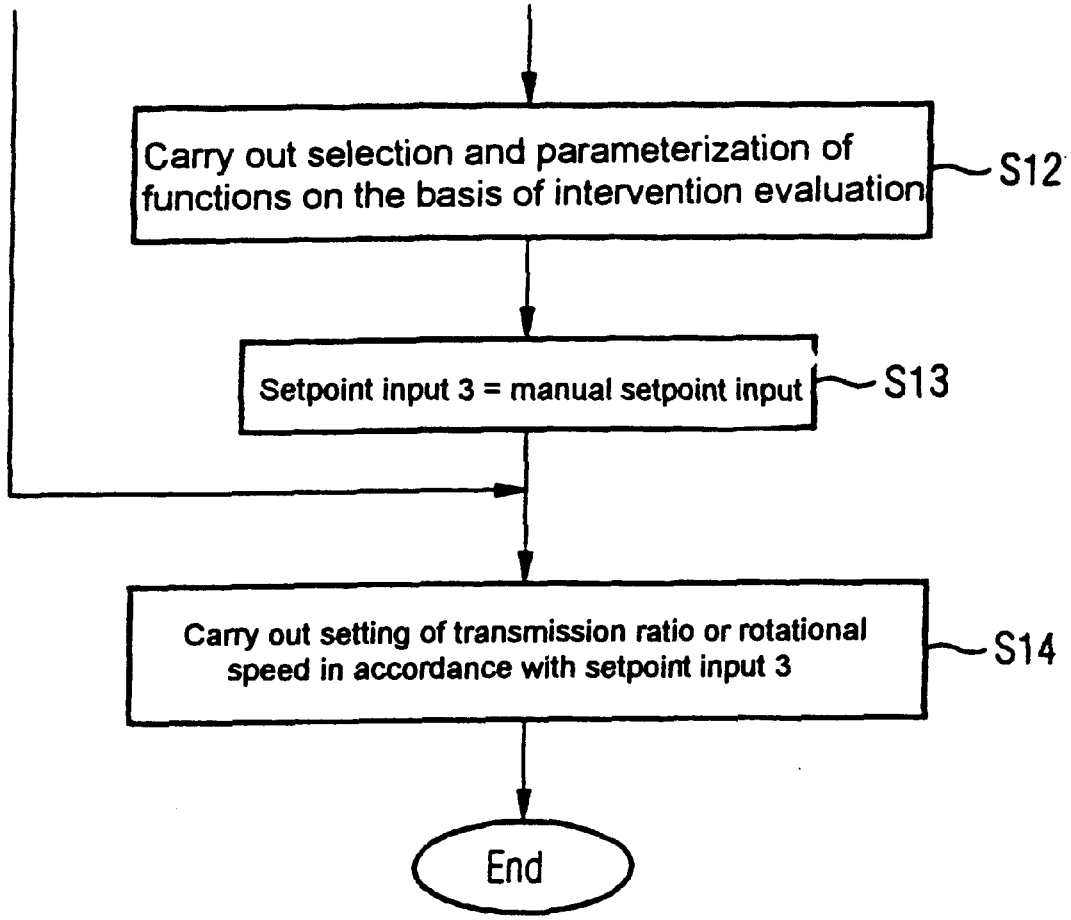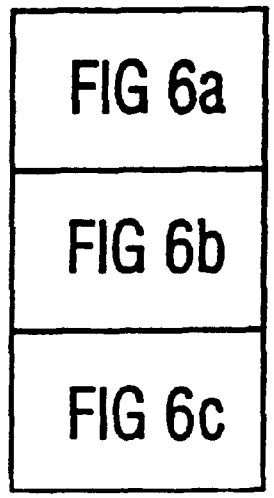

CONTROLLER FOR AN AUTOMATIC TRANSMISSION IN A MOTOR VEHICLE

CROSS-REFERENCE TO RELATED APPLICATION

This is a continuation of copending international application PCT/DE96/02437, filed Dec. 17, 1996, which designated the United States.

BACKGROUND OF THE INVENTION

Field of the Invention

The invention relates to motor vehicle controllers and, more particularly, to a control unit for an automatic transmission of a motor vehicle. The controller or control unit defines an actuation signal for the transmission as a function of a variable which defines the output torque desired by the driver, of a measured variable which defines the engine speed or the vehicle speed, and, if appropriate, of further measured variables. The system has a classification system to which the measured variables, or parameters derived therefrom are fed as input variables and by means of which an output variable is generated with reference to an evaluation of the measured variables and parameters, with which output variable, in accordance with prescribed assignments, the driving behavior of the driver, the respective driving state or the respective load state of the motor vehicle is taken into account during the determination of the transmission ratio. If the transmission is a step-by-step variable speed transmission, then the controller generates actuation signals or shift signals with which the respective most favorable gear speed is selected. If the transmission is an infinitely variable speed transmission, the actuating signal controls the transmission ratio. Controllers of this type are also used, analogously, in the context of other devices or assemblies in motor vehicles, such as a traction controller or a rear wheel steering system.

Modern transmission controllers adapt the selection of the gear speed or transmission ratio to, inter alia, the driving behavior of the driver and/or the route In the first case, the behavior of the driver is evaluated by reference to characteristic input variables of the controller and derived variables calculated therefrom (referred to below as derivatives or else parameters), and it is converted into a modified transmission ratio selection adapted to the driver. See European application EP 0 638 742 and U.S. Pat. No. 4,679,145 (German patent DE 33 41 652 C2). The knowledge which is stored in the controller in the form of a reference and with which, for example, the driver is classified as "steady", "normal", or "sporty", is permanently prescribed here and there is always a fixed assignment between a behavior of the driver and a "driver class." Thus, frequent and rapid movement of the accelerator pedal, for example, will always lead to a sporty evaluation of the driver and to the activation of a corresponding transmission ratio selection, i.e. for example to shifting up at relatively high rotational speeds.

However, such a fixed assignment is not satisfactory in all cases. For example, it is perfectly possible for an objectively rather steady driver, i.e. a driver who does not require high driving performance and acceleration, nevertheless, for some reason, to make frequent and rapid pedal changes. This can lead to an incorrect adaptation of the control system. It is also possible that the gear-shifting behavior or transmission ratio selection assigned to the driver by the controller simply does not correspond to what she imagines as her ideal.

There are also other basic functions of an adaptive transmission controller which, owing to the generally fixed assignment, cause the controller to behave in a way which is not accepted by the driver. This is a result not only of the different personal wishes of drivers but also can be due to the fact that there are different driving habits in different countries. For example, an active gear-shifting strategy, which is heavily influenced by manually shifted transmissions, is generally considered ideal in Europe, while the typical driver in the United States prefers the traditional automatic transmission controller which uses manually selected gear-shifting patterns. A system which is highly adaptive in accordance with European habits will not generally be accepted in the United States.

An example of different drivers' wishes is the adapted gear-shifting behavior on an uphill route. From a technical point of view, the selection of a prescribed gear-shifting pattern which prevents so-called oscillating in the gear-shifting in a step-by-step variable speed transmission is most expedient. For this purpose, shifting-up operations are generally displaced to a higher traveling speed. However, this may be disruptive for those drivers who are accustomed to an absolutely fixed relationship between one position of the accelerator pedal, one speed of the vehicle and the respective transmission ratio or the respective gear speed, and thus prefer such a constant control behavior. In order to be able to satisfy such drivers with an adaptive transmission controller, it is therefore necessary to be able to correct or modify the "fixed knowledge" stored in the transmission controller.

SUMMARY OF THE INVENTION

It is accordingly an object of the invention to provide a controller for an automatic transmission of a motor vehicle, which overcomes the above-mentioned disadvantages of the heretofore-known devices and methods of this general type and which, while having an adaptive design, is also adaptable to individual or regionally different drivers' wishes.

With the foregoing and other objects in view there is provided, in accordance with the invention, a controller for an automatic transmission in a motor vehicle, comprising:

an input receiving a signal representing a first variable defining an output torque of an automatic transmission desired by a driver of a motor vehicle, and a signal representing a second variable defining one of an engine speed and a motor vehicle speed;

an output outputting an actuation signal for the automatic transmission;

a classification system receiving the first and second variables, or parameters derived therefrom, as input variables, the classification system generating an output variable from the input variables, wherein the output variable defines a selection of a transmission ratio of the automatic transmission in accordance with prescribed assignments of a driver's driving behavior to given driver classes, and one of a respective driving state and a respective load state of the motor vehicle; and an evaluation circuit receiving an intervention signal generated by a manual intervention by the driver, the evaluation circuit evaluating the intervention signal and generating a modified actuation signal for the transmission ratio by modifying one of the prescribed assignments of the driver's driving behavior to the given driver class.

In accordance with an added feature of the invention, the evaluation circuit compares an actuation signal of the controller with the intervention signal generated by the driver and, if a deviation is determined, the evaluation circuit generates an intervention evaluation signal bringing about one of a parameterization and a selection of functions of the controller.

In accordance with an additional feature of the invention, the evaluation circuit includes a parameterization circuit and/or a selection circuit evaluating the intervention evaluation signal and determining therefrom a circuit component of the controller causing a deviation from the driver's wishes.

In accordance with a further feature of the invention, the above-mentioned circuit component is a signal conditioning circuit, a classification circuit, a strategy selection circuit, a transmission-ratio selection circuit, and/or a correction circuit. These circuit components are connected to the parameterization and/or selection circuit via bidirectional data lines.

In accordance with another feature of the invention, the intervention signal is adapted to influence brief actuation signals of the controller, as well as medium-term and long-term functions of the controller.

In accordance with a concomitant feature of the invention, the intervention signal modifies fuzzy rules contained in the controller and thus modifies the actuation signal generated in the evaluation circuit.

One advantage of the invention consists, in particular, in the fact that it is also very suitable for infinitely variable speed transmissions (CVT). Many drivers of motor vehicles are, for reasons of principle, unaccustomed to such transmissions: their controller which is configured according to technical expedience changes the engine speed only to a small degree, in order to utilize the region of maximum engine efficiency. The controller according to the invention provides the driver with a possibility of access in order to obtain the transmission ratio selection desired by him or her.

Other features which are considered as characteristic for the invention are set forth in the appended claims.

Although the invention is illustrated and described herein as embodied in a controller for an automatic transmission in a motor vehicle, it is nevertheless not intended to be limited to the details shown, since various modifications and structural changes may be made therein without departing from the spirit of the invention and within the scope and range of equivalents of the claims. For instance, controllers of this type may also be adapted for use in the context of other devices or assemblies in motor vehicles, such as a traction controller or a rear wheel steering system. Furthermore, the term "controller" as used in this specification is equivalent to "control unit", "control device", and the like.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a plan view of a steering wheel, providing a first exemplary embodiment of a control device with which the driver can intervene in the controller according to FIG. 1;

FIG. 3 is a side view of a conventional gear selector;

FIG. 4 is a schematic top plan view onto a gear selector slot, providing a second exemplary embodiment of the control device;

FIG. 5 is a side view of a gear selector with a third exemplary embodiment of the control device; and FIG. 6 is a flowchart—separated into three sheets FIG. 6*a*, FIG. 6*b*, and FIG. 6*c*—of a program which is processed in the controller according to FIG. 1.

DESCRIPTION OF THE PREFERRED EMBODIMENTS

Figure 1:
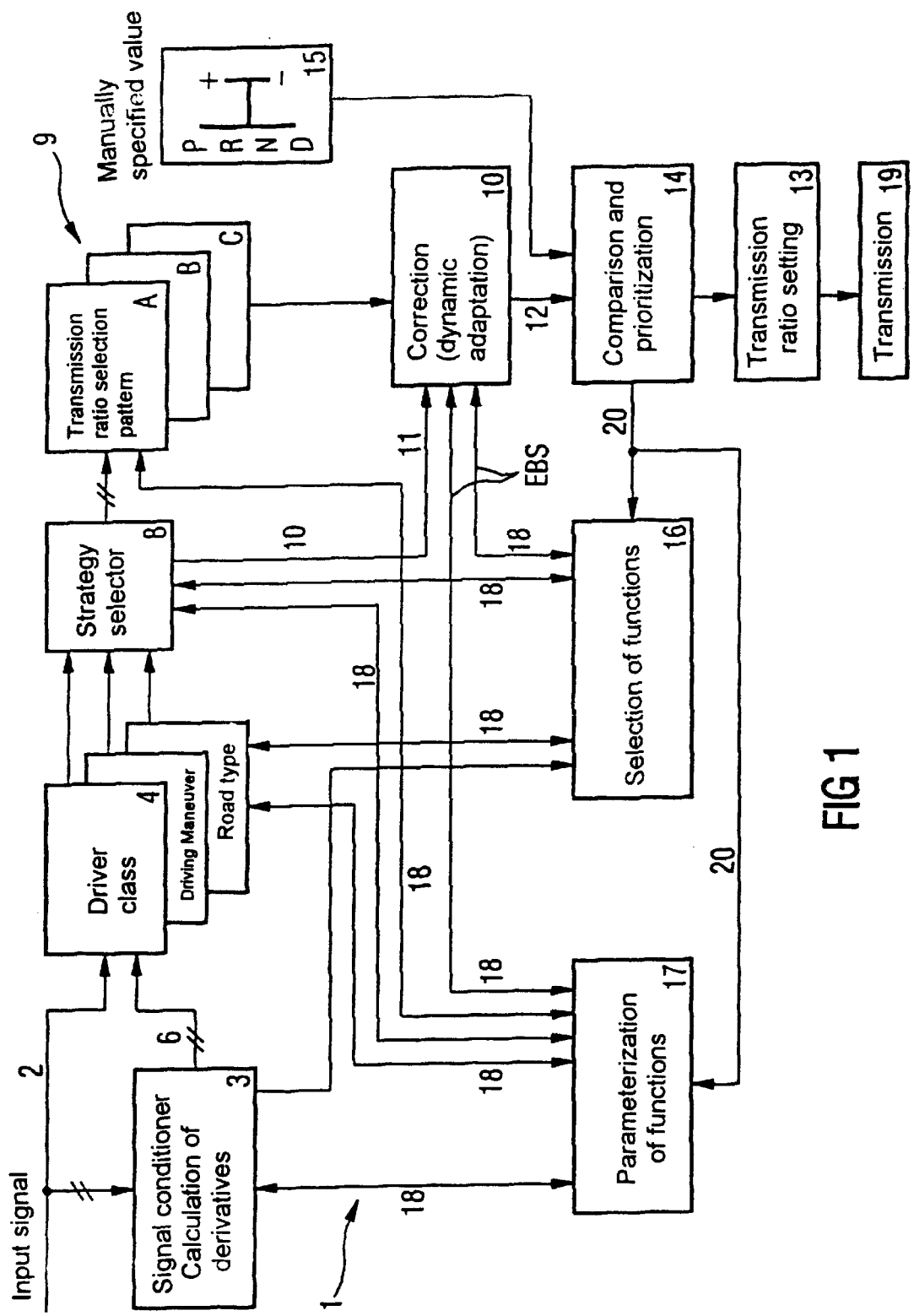
FIG. 1 is a block diagram of the controller according to the invention.

Referring now to the figures of the drawing in detail and first, particularly, to FIG. 1 thereof, there is seen a controller 1 that receives, via a signal line 2, various input signals supplied by various sensors in a motor vehicle and also by various control units in the motor vehicle. Possible examples are a variable which defines the power or output torque requirement by the driver, for example a signal dk which represents the throttle valve position, and a signal which defines the output speed of the transmission nab and thus the speed of the vehicle, or a signal which defines the engine speed. Wheel speed signals, lateral acceleration signals and longitudinal acceleration signals can also be received by corresponding sensors or else by other control units, for example an ABS control unit.

The input signals which are received via the signal line 2 are fed to a signal conditioning circuit 3, also referred to below as a signal conditioner, and to a classification system 4. Details of the input signals, of the sensors, of the other control units, of the signal conditioner, and of the classification system are described in the above-mentioned European patent application EP 0 638 742, which is herewith incorporated by reference.

In the signal conditioner 3, derived variables or derivatives calculated from the input signals are fed via a signal line 6 to the classification system 4 and are also evaluated there. The classification system 4 contains, as indicated in the drawing, a driver classification circuit, a driving maneuver circuit, and a road-type classification circuit. The output signals of the classification system 4 characterizing the respective variable are fed to a strategy selection circuit 8, referred to below as a strategy selector, which generates selection signals according to a prescribed strategy, which signals are transmitted to a memory 9 and select there one from a plurality of stored transmission ratio selection patterns A, B or C. In a step-by-step transmission, the transmission ratio selection patterns are defined in gear-shift characteristic fields.

The output signal of the memory 9 that specifies a transmission ratio or a gear speed, is fed to a correction circuit 10. There, it can be temporarily adapted to particular situations by a dynamic correction signal which is generated by the strategy selector 8 and transmitted via a signal line 11. With this correction signal the risk of possible dynamically unfavorable driving situations, for instance during cornering, can be prevented.

The output signal of the correction circuit 10 is fed via a signal line 12 and an evaluation circuit 14 (to be described in the following text), to a transmission-ratio setting circuit 13 which generates an actuation signal STS which is transmitted to an automatic transmission 19 and specifies there the transmission ratio to be set or, in the case of an infinitely variable speed transmission, the target rotational speed.

The evaluation circuit 14 is designed as a comparator circuit. There, the setpoint input specified by the adaptive controller, i.e. the actuation signal or gear-shifting instruction which is received via the signal line 12, is compared with an intervention signal which is entered manually by the driver via a control device 15. In the event of a deviation between the two signals, an item of information relating to this deviation is transmitted, in the form of an intervention evaluation signal EBS, to a selection circuit 16 and to a parameterization circuit 17, and is evaluated in these circuits.

By means of the evaluation it is determined which of the circuits 3, 4, 8, 9 and 10 is causing the deviation that has been determined. The individual circuits or circuit components of the controller 1 which are specified above are all connected to one another by means of bidirectional data lines 18. As a result, it is possible to intervene in all the circuit components 3, 4, 8, 9 and 10 which determine the gear speed selection or transmission ratio selection, the intervention being specifically such that future gear-shifting decisions are as far as possible compatible with the driver's wishes, i.e. that it is not necessary to make any further manual interventions afterwards, or, if manual interventions take place, that they correspond as far as possible to the decisions of the controller 1. The evaluation circuit 14 is connected to the circuits 16 and 17 via a unidirectional signal line 20.

Certain subfunctions of the controller 1 are completely activated or switched off by means of the selection circuit 16. If, for example, the classification system 4 detects "uphill travel", the strategy selector 8 selects from the memory 9 a transmission ratio selection pattern which is suitable for uphill travel. If the driver intervenes, in order, for example, to trigger shifting up, it is possible, by means of the selection circuit 16, to avoid the activation of the uphill travel program and thus modified triggering of shifting-up operations at relatively high vehicle speeds or engine speeds.

Another example is the suppression of shifting-up operations when cornering, which is brought about by the driving maneuver classifier of the classification system 4, by the strategy selector 8 and by a dynamic correction in the correction circuit 10. If the driver does not wish to retain the low gear speed when cornering, and communicates this by means of a manual gear-shifting instruction via the control device 15, the circuits 4, 8 and 10 are influenced by the selection circuit 16 in such a way that the adaptation of gear-shifting points of transmission ratio selection does not take place during cornering.

By means of the parameterization circuit 17, a number of important parameters of subfunctions which are stored in the controller 1 are changed without, however, entirely deactivating them. The functions are, in particular, as follows:

1) transmission ratio selection patterns which are stored in the circuit 6, for example in the form of gear-shifting characteristic curves, are displaced;
2) selection parameters which are stored in the circuit 8 are changed, for example in order to activate a "sporty" driving mode less often;
3) the classification system 4 is changed; if the classification system is a fuzzy system (as described in EP-A 0 638 742), prescribed rules can be calibrated so as to be "more sensitive" or "less sensitive". One of the rules of that system is:

if ddk_mean is high then driver=sporty.

The effect of this rule is that if the accelerator pedal is activated very often, then the driver is classified as "sporty". If the rule applies 100% in all cases, then the strategy selector 8 will select a driving performance-optimized transmission ratio selection pattern from the memory 9, which leads to higher engine speeds. If the driver is not in agreement with this, she will consequently repeatedly request shifting-up operations. The parameterization circuit 17 implements this as a deactivation of the above-mentioned rule and thus achieves a greater degree of correspondence between the gear-shifting behavior and the driver's wishes. In addition, it is possible to assign a different membership function "very high", so that the driver is no longer classified as "sporty" given the current behavior;

4) The conditioning of the input signals in the signal conditioning circuit 3 can also be influenced in such a way that a displacement can be performed in the "less sensitive" direction, for example by using a smaller conversion factor or amplification factor in the circuit 3, and a modified gear-shifting behavior is thus obtained.

The decisive factor is that the intervention valuation circuit 14 makes significant information available on the line 20 in order to adjust the individual parameters of the transmission controller accordingly and to be able to perform in the circuit components 16 and 17 a correlation of the cause of the deviation. In this context, there is a need for both immediate information on the driver's wishes, in order to change short-term functions such as "retain gear speed when cornering", and for medium-term and long-term information relating to deviations from the driver's wishes, in order to implement changes to functions which are active in corresponding periods of time.

FIGS. 2 to 5 show various exemplary embodiments of the control device 15:

With a button 15a on the steering wheel, the driver can enter intervention signals "+" for shifting up and "−" for shifting down (FIG. 2).

Using a conventional gear-shift lever 15b, the driver can prescribe the desired gear speed by means of the customary positions (e.g. 4-3-2) (FIG. 3).

By means of a "manual slot" which has the positions P, R, N, D, 3, 2, 1 and is combined with a selector lever for "+" and "−", the driver can also prescribe the desired gear speed (FIG. 4).

A further possible way of prescribing the desired gear speed is an operating rocker on the selector lever with the positions "+" and "−" (FIG. 5).

A program which is processed in the controller 1 and is in the form of a flowchart or structure diagram will now be explained with reference to FIG. 6 which is divided into the individual figure sheets 6a, 6b and 6c.

Upon the program start, input signals are read in via the signal line 1 in a step S1. In a step S2, derivatives are calculated from the input signals in the signal conditioner 3. In a step S3, a classification of the driver and, if appropriate, the driving maneuvers, of the road type etc. takes place in the classification system 4. In a step S4, a strategy selection and a selection of a transmission selection pattern from the memory 9 takes place in the circuit 8. In a step S5, the setpoint transmission ratio or setpoint rotational speed is calculated or defined in accordance with the selected transmission ratio selection pattern. This setpoint transmission ratio or setpoint rotational speed is referred to as setpoint input 1.

Step S6 (FIG. 6b) contains a query whether or not a dynamic correction is to be carried out in the correction circuit. If not, in a step S7, the setpoint input value 1 is assigned to a setpoint input 2 and the system jumps to a step S9. If this is the case, in a step S8 the setpoint input value 1 plus/minus a correction value is assigned to the setpoint input 2.

In the step S9 it is interrogated whether the setpoint input 2 is identical to the manual setpoint input or entry by the driver. If this is the case, in a step S10 the setpoint input 2 is assigned to a setpoint input 3, and a jump takes place to a step S14. If not, then the evaluation circuit 14 calculates an intervention evaluation in a step S11.

Then, in a step S12 (FIG. 6c), the circuit components 16 and 17 select and parameterize the functions on the basis of the intervention evaluation. In a step S13, the value of the manual setpoint input by the driver is assigned to a setpoint input 3. Finally, in the step S14 a transmission ratio setting or rotational setting is carried out by the transmission-ratio setting circuit 13 in accordance with the setpoint input 3. A modified actuation signal STS is then transmitted to the transmission 19. The program run has then come to an end.

I claim:

1. A controller for an automatic transmission in a motor vehicle, comprising:
    an input receiving a signal representing a first variable defining an output torque of an automatic transmission desired by a driver of a motor vehicle, and a signal representing a second variable defining one of an engine speed and a motor vehicle speed;
    an output outputting an actuation signal for the automatic transmission;
    a classification system receiving the first and second variables, or parameters derived therefrom, as input variables, said classification system generating an output variable from said input variables, wherein said output variable defines a selection of a transmission ratio of the automatic transmission in accordance with prescribed assignments of a driver's driving behavior to given driver classes, and one of a respective driving state and a respective load state of the motor vehicle; and
    an evaluation circuit receiving an intervention signal generated by a manual intervention by the driver, said evaluation circuit evaluating the intervention signal and generating a modified actuation signal for the transmission ratio by modifying one of the prescribed assignments of the driver's driving behavior to the given driver class.

2. The controller according to claim 1, wherein said evaluation circuit compares an actuation signal of the controller with the intervention signal generated by the driver and, if a deviation is determined, said evaluation circuit generates an intervention evaluation signal bringing about one of a parameterization and a selection of functions of the controller.

3. The controller according to claim 1, wherein said evaluation circuit includes a parameterization circuit evaluating the intervention evaluation signal and determining therefrom a circuit component of the controller causing a deviation from the driver's wishes.

4. The controller according to claim 3, which further comprises at least one circuit component selected from the group consisting of a signal conditioning circuit, a classification circuit, a strategy selection circuit, a transmission-ratio selection circuit, and a correction circuit, each connected to said parameterization circuit via bidirectional data lines.

5. The controller according to claim 1, wherein said evaluation circuit includes a parameterization circuit and a selection circuit evaluating the intervention evaluation signal and determining therefrom a circuit component of the controller causing a deviation from the driver's wishes.

6. The controller according to claim 5, which further comprises at least one circuit component selected from the group consisting of a signal conditioning circuit, a classification circuit, a strategy selection circuit, a transmission-ratio selection circuit, and a correction circuit, each connected to said parameterization circuit and to said selection circuit via bidirectional data lines.

7. The controller according to claim 1, wherein said evaluation circuit includes a selection circuit evaluating the intervention evaluation signal and determining therefrom a circuit component of the controller causing a deviation from the driver's wishes.

8. The controller according to claim 7, which further comprises at least one circuit component selected from the group consisting of a signal conditioning circuit, a classification circuit, a strategy selection circuit, a transmission-ratio selection circuit, and a correction circuit, each connected to said selection circuit via bidirectional data lines.

9. The controller according to claim 1, wherein the intervention signal is adapted to influence brief actuation signals of the controller, as well as medium-term and long-term functions of the controller.

10. The controller according to claim 1, wherein said intervention signal modifies fuzzy rules contained in the controller and thus modifies the actuation signal generated in said evaluation circuit.

* * * * *